US009055276B2

(12) United States Patent
Parulski (10) Patent No.: US 9,055,276 B2
(45) Date of Patent: Jun. 9, 2015

(54) CAMERA HAVING PROCESSING CUSTOMIZED FOR IDENTIFIED PERSONS

(75) Inventor: Kenneth Alan Parulski, Rochester, NY (US)

(73) Assignee: Apple Inc., Cupertino, CA (US)

( * ) Notice: Subject to any disclaimer, the term of this patent is extended or adjusted under 35 U.S.C. 154(b) by 552 days.

(21) Appl. No.: 13/193,687

(22) Filed: Jul. 29, 2011

(65) Prior Publication Data

US 2013/0027571 A1   Jan. 31, 2013

(51) Int. Cl.
*H04N 5/76* (2006.01)
*H04N 5/907* (2006.01)
*H04N 5/232* (2006.01)
*H04N 5/77* (2006.01)
*H04N 9/804* (2006.01)
*H04N 9/82* (2006.01)

(52) U.S. Cl.
CPC ............. *H04N 5/907* (2013.01); *H04N 5/232* (2013.01); *H04N 5/23219* (2013.01); *H04N 5/772* (2013.01); *H04N 9/8042* (2013.01); *H04N 9/8205* (2013.01); *H04N 9/8211* (2013.01)

(58) Field of Classification Search
CPC ............................... H04N 5/907; H04N 5/232
USPC ........................................... 348/207.1, 231.6
See application file for complete search history.

(56) References Cited

U.S. PATENT DOCUMENTS

| | | |
|---|---|---|
| 3,971,065 A | 7/1976 | Bayer |
| 4,642,678 A | 2/1987 | Cok |
| 4,774,574 A | 9/1988 | Daly et al. |
| 4,975,969 A | 12/1990 | Tal |
| 5,189,511 A | 2/1993 | Parulski et al. |
| 5,493,335 A | 2/1996 | Parulski et al. |
| 5,652,621 A | 7/1997 | Adams, Jr. et al. |
| 5,668,597 A | 9/1997 | Parulski et al. |
| 6,192,162 B1 | 2/2001 | Hamilton, Jr. et al. |
| 6,292,218 B1 | 9/2001 | Parulski et al. |
| 6,389,181 B2 | 5/2002 | Shaffer |
| 6,526,158 B1 | 2/2003 | Goldberg |
| 6,573,927 B2 | 6/2003 | Parulski et al. |
| 6,785,421 B1 | 8/2004 | Gindele |
| 6,901,378 B1 | 5/2005 | Linker |
| 6,903,762 B2 | 6/2005 | Prabhu et al. |
| 6,934,056 B2 | 8/2005 | Gindele |
| 6,940,545 B1 | 9/2005 | Ray et al. |
| 6,999,111 B2 | 2/2006 | McIntyre et al. |
| 7,024,051 B2 | 4/2006 | Miller et al. |

(Continued)

OTHER PUBLICATIONS

Jefferson Graham, "Color app for iPhone lets others peek at your photos, video," http://www.usatoday.com/tech/news/2011-03-23-iphone-photo-sharing.htm, posted Mar. 23, 2011.

*Primary Examiner* — Gevell Selby
(74) *Attorney, Agent, or Firm* — Wong, Cabello, Lutsch, Rutherford & Brucculeri, LLP (57) ABSTRACT

A digital camera system that implements a method for providing image processing customized according to an identified person. The method includes: capturing an input digital image of a scene; identifying at least one particular person in the input digital image by analyzing signals received from an electronic device associated with the particular person; retrieving image processing preferences, wherein the retrieved image processing preferences are associated with one of the identified particular persons; processing the input digital image to form a modified digital image according to retrieved image processing preferences; and storing the modified digital image in a storage memory.

23 Claims, 7 Drawing Sheets

(56) References Cited

U.S. PATENT DOCUMENTS

| | | |
|---|---|---|
| 7,043,527 B2 | 5/2006 | Shiimori |
| 7,082,227 B1 | 7/2006 | Baum et al. |
| 7,218,776 B2 | 5/2007 | Sowinski |
| 7,224,383 B2 | 5/2007 | Tecu |
| 7,275,044 B2 | 9/2007 | Chauvin |
| 7,302,115 B2 | 11/2007 | Fredlund |
| 7,327,505 B2 | 2/2008 | Fedorovskaya |
| 7,362,919 B2 | 4/2008 | Das |
| 7,391,528 B2 | 6/2008 | Kacker |
| 7,542,077 B2 | 6/2009 | Miki |
| 7,599,527 B2 | 10/2009 | Shah et al. |
| 7,636,733 B1 | 12/2009 | Rothmuller |
| 7,958,139 B2 | 6/2011 | Frazier |
| 8,166,034 B2 | 4/2012 | Tsukagoshi |
| 8,224,824 B2 | 7/2012 | Tsukagoshi |
| 8,275,764 B2 | 9/2012 | Jeon |
| 8,463,777 B2 | 6/2013 | Tokashiki |
| 2002/0054224 A1 | 5/2002 | Wasula |
| 2002/0093678 A1 | 7/2002 | Skidgel |
| 2002/0109579 A1* | 8/2002 | Pollard et al. ............... 340/5.53 |
| 2003/0154178 A1 | 8/2003 | McIntyre |
| 2003/0182210 A1 | 9/2003 | Weitzman |
| 2004/0085578 A1 | 5/2004 | Quek |
| 2005/0046730 A1* | 3/2005 | Li ............................. 348/333.12 |
| 2005/0275870 A1 | 12/2005 | Elarde |
| 2006/0248452 A1 | 11/2006 | Lambert |
| 2007/0005571 A1 | 1/2007 | Brewer |
| 2007/0024931 A1 | 2/2007 | Compton et al. |
| 2007/0143445 A1 | 6/2007 | Dandekar |
| 2007/0244925 A1 | 10/2007 | Albouze |
| 2008/0209349 A1 | 8/2008 | Macadaan |
| 2008/0259734 A1 | 10/2008 | Jain |
| 2008/0306749 A1 | 12/2008 | Fredlund |
| 2009/0051826 A1 | 2/2009 | Chang |
| 2009/0144657 A1 | 6/2009 | Zhang |
| 2009/0171787 A1 | 7/2009 | Mei |
| 2009/0297032 A1 | 12/2009 | Loui et al. |
| 2009/0313285 A1 | 12/2009 | Hronopoulos |
| 2010/0002084 A1* | 1/2010 | Hattori et al. ............... 348/207.1 |
| 2010/0057722 A1 | 3/2010 | Nakamura |
| 2010/0088152 A1 | 4/2010 | Bennett |
| 2010/0153411 A1 | 6/2010 | Toebes |
| 2010/0231753 A1* | 9/2010 | Hagiwara ................... 348/231.6 |
| 2011/0058787 A1* | 3/2011 | Hamada ........................ 386/224 |
| 2011/0072035 A1 | 3/2011 | Gaucas |
| 2011/0270947 A1 | 11/2011 | Cok |
| 2013/0027569 A1 | 1/2013 | Parulski |

* cited by examiner

| | PERSON #1 | PERSON #2 | PERSON #3 |
|---|---|---|---|
| NAME | JONATHAN | DAVID | SUSAN |
| NICKNAME | JON | DAVE | SUSIE |
| IMAGE OF PERSON | | | |
| PERSON RECOGNITION DATA | PERSON #1 RECOGNITION DATA | PERSON #2 RECOGNITION DATA | PERSON #3 RECOGNITION DATA |
| IMAGE ADJUSTMENT PREFERENCES | PERSON #1 IMAGE ADJUSTMENT PREFS | PERSON #2 IMAGE ADJUSTMENT PREFS | PERSON #3 IMAGE ADJUSTMENT PREFS |
| IMAGE PRODUCT PREFERENCES | PERSON #1 IMAGE PRODUCT PREFS | PERSON #2 IMAGE PRODUCT PREFS | PERSON #3 IMAGE PRODUCT PREFS |
| IMAGE FORMAT PREFERENCES | PERSON #1 IMAGE FORMAT PREFS | PERSON #2 IMAGE FORMAT PREFS | PERSON #3 IMAGE FORMAT PREFS |
| SHARING PREFERENCES | PERSON #1 SHARING PREFS | PERSON #2 SHARING PREFS | PERSON #3 SHARING PREFS |

CAMERA HAVING PROCESSING CUSTOMIZED FOR IDENTIFIED PERSONS

CROSS-REFERENCE TO RELATED APPLICATIONS

Reference is made to co-pending U.S. patent application Ser. No. 12/769,954, entitled: "Digital imaging method employing user personalization and image utilization profiles", by Cok et al., and to co-pending U.S. patent application Ser. No. 13/193,678, entitled "Camera having processing customized for recognized persons", by Parulski, both of which is incorporated herein by reference.

FIELD OF THE INVENTION

This invention pertains to the field of digital cameras, and more particularly to a digital camera having image processing which is modified based on a person pictured in the image.

BACKGROUND OF THE INVENTION

Digital cameras capture, process, and store digital images. These digital images can be transferred to other devices (e.g., by a network) for viewing, storage and printing. In many cases, digital images are captured of a particular person, and then "shared" with that person.

Digital cameras typically offer a variety of different camera settings or modes for different types of situations and subjects. For example, digital cameras can include automatic mode selection to select portrait mode, macro mode, sunset mode, etc. The image processing applied by the digital camera is then adjusted in accordance with the selected settings.

It is known to customize the image processing used in a digital camera based on the user of the digital camera. For example, U.S. Pat. No. 6,903,762 to Prabhu, et al., entitled "Customizing a digital camera for a plurality of users," which incorporated herein by reference, discloses a user customization method for a digital camera wherein when the digital camera is powered on, the user selects their name from a list of users displayed on the image display. A processor in the digital camera then uses the appropriate stored settings to provide a customized feature set for the particular user of the digital camera. These settings can include image processing parameters, such as an image sharpness setting and a color balance setting. Similarly, U.S. Pat. No. 7,082,227, to Baum et al., entitled "Producing printed images having personalization features," teaches an architecture for producing printed images according to personalized image adjustment preferences for a user.

Recently, digital cameras have been developed that automatically detect the presence of a face in an image and automatically set the digital camera to a mode suitable for capturing people, such as a portrait mode. It is also known to provide a digital camera that uses a face recognition algorithm to identify particular people in an image. Metadata is then stored in association with the captured digital image that identifies one or more people depicted in the captured digital image.

U.S. Patent Application Publication 2007/0140532 to Goffin, entitled "Method and apparatus for providing user profiling based on facial recognition," discloses the use of user profiles for digital imaging devices based on facial recognition. This patent application describes electronic devices that capture an image of the user of the device, and then use face recognition to determine the identity of the user. Various device parameters (such as the volume level) can then be automatically adjusted according to the preferences of the identified user. This approach can be used for a variety of different electronic devices such as personal computers, telephones, videophones, automated teller machines, personal data assistance and media players.

While the above methods can be used to provide customization according to the personal preferences of the user of a digital camera, it makes no provision for the fact that the subjects of captured images often have personal preferences concerning photographs in which they are depicted. For example, they might prefer images with a particular sharpness setting or color saturation.

In order to obtain an image that the subject prefers, current approaches require the photographer to manually adjust the settings of the digital camera according to the preferences of the subject. However, it can be awkward and time consuming for the subject to wait for the photographer to adjust the camera settings. Alternatively, the photographer can capture the image using a set of default settings, and the photographer or the subject can manually edit the image at a later time to adjust the image according to the preferences of the subject.

There remains a need to provide digital images that are preferred by the subject of the photograph, rather than by the photographer.

SUMMARY OF THE INVENTION

The present invention represents a digital camera providing customized image processing, comprising:
  an image sensor for capturing a digital image;
  an optical system for forming an image of a scene onto the image sensor;
  a data processing system;
  a storage memory for storing captured images;
  a data memory for storing image processing preferences associated with a plurality of persons; and
  a program memory communicatively connected to the data processing system and storing executable instructions configured to cause the data processing system to implement a method for providing image processing customized according to an identified person, wherein the method includes:
    capturing an input digital image of a scene using the image sensor;
    identifying at least one particular person in the input digital image by analyzing a signal received from an electronic device associated with the particular person;
    retrieving image processing preferences from the data memory, wherein the retrieved image processing preferences are associated with one of the identified particular persons;
    processing the input digital image to form a modified digital image according to the retrieved image processing preferences; and
    storing the modified digital image in the storage memory.

The present invention has the advantage that customized digital images are provided according to the preferences of the persons pictured in the digital images.

It has the additional advantage that when a photographer shares a digital image with a person pictured in the digital image, the satisfaction level of the person will be higher since it will have been processed according to their personal preferences.

It has the further advantage that when a digital image contains multiple persons, individualized versions of the digital image can be provided for each of the persons.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 1:
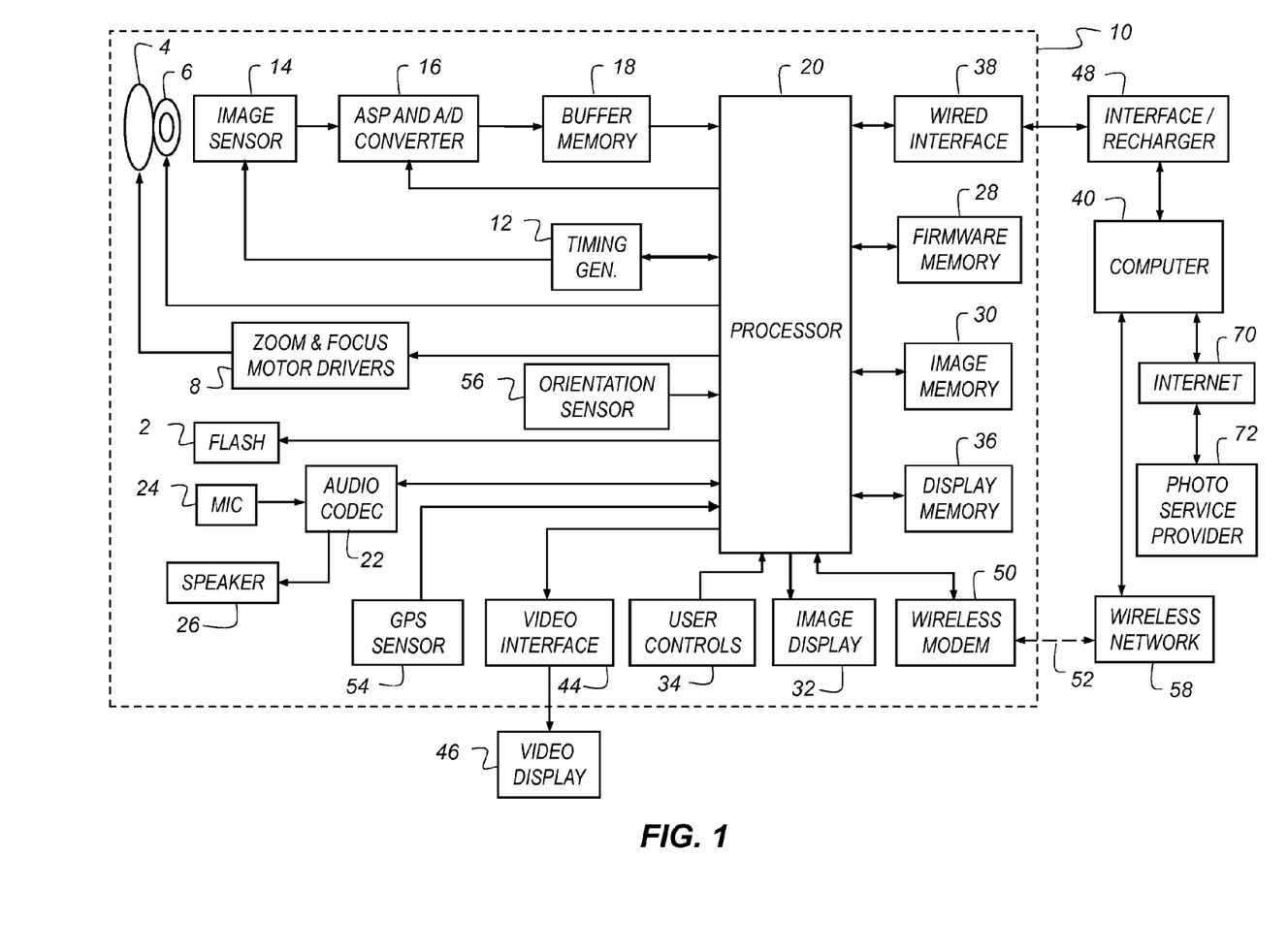
FIG. 1 is a high-level diagram showing the components of a digital camera system.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in U.S. Pat. No. 3,971,065, "Color imaging array" to Bayer, the disclosure of which is incorporated herein by reference. As a second example, the different color pixels can be arranged as described in U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

Figure 3A:
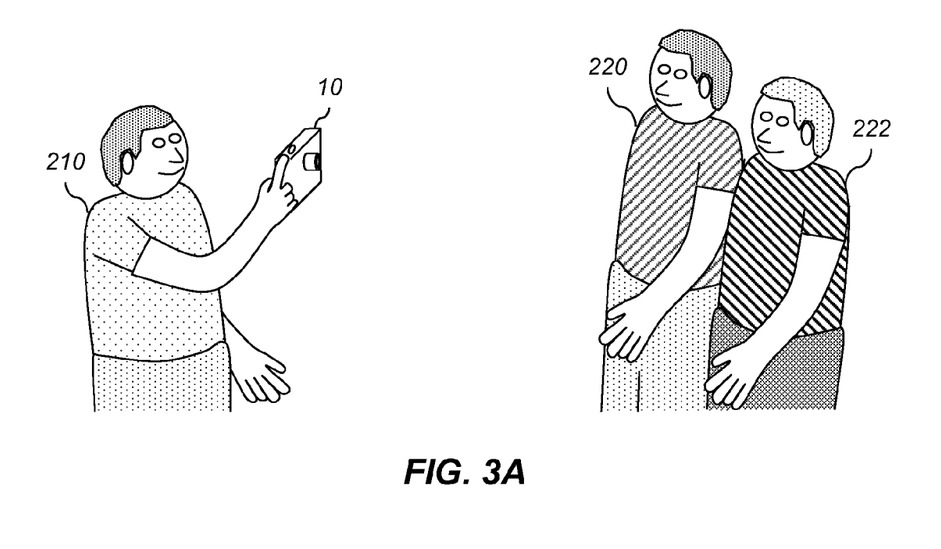
FIG. 3A is a diagram illustrating a photographic capture situation.

In some embodiments, a global position system (GPS) sensor 54 in the digital camera 10 can be used to provide geographical location information which is used for implementing the present invention, as will be described later with respect to FIG. 3. GPS sensors 54 are well-known in the art and operate by sensing signals emitted from GPS satellites. A GPS sensor 54 receives highly accurate time signals transmitted from GPS satellites. The precise geographical location of the GPS sensor 54 can be determined by analyzing time differences between the signals received from a plurality of GPS satellites positioned at known locations.

In some embodiments, the digital camera 10 includes contains an orientation sensor 56 for sensing an orientation of the digital camera 10. Orientation sensors 56 are well-known in the art and generally use components such as accelerometers, gyroscopes and electronic compasses to sense an orientation.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

According to some embodiments, during preview mode, the processor 20 analyzes the input digital image using a person recognition algorithm to identify at least one particular person in the input digital image. Any type of person recognition algorithm known in the art can be used in accordance with the present invention. Examples of person recognition algorithms include facial recognition algorithms such as those taught in U.S. Pat. No. 6,940,545 to Ray et al., entitled "Face detecting camera and method," U.S. Pat. No. 4,975,969 to Tal, entitled "Method and apparatus for uniquely identifying individuals by particular physical characteristics and security system utilizing the same," and U.S. Pat. No. 7,599,527 to Shah et al., entitled "Digital image search system and method," all of which are incorporated herein by reference. Facial recognition algorithms typically work by determining various facial parameters corresponding to ratios of distances between identifiable points on the human face. The facial parameters determined for a face in a particular digital image can be compared to reference facial parameters determined for a set of predefined persons to determine whether there is a statistically significant match.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
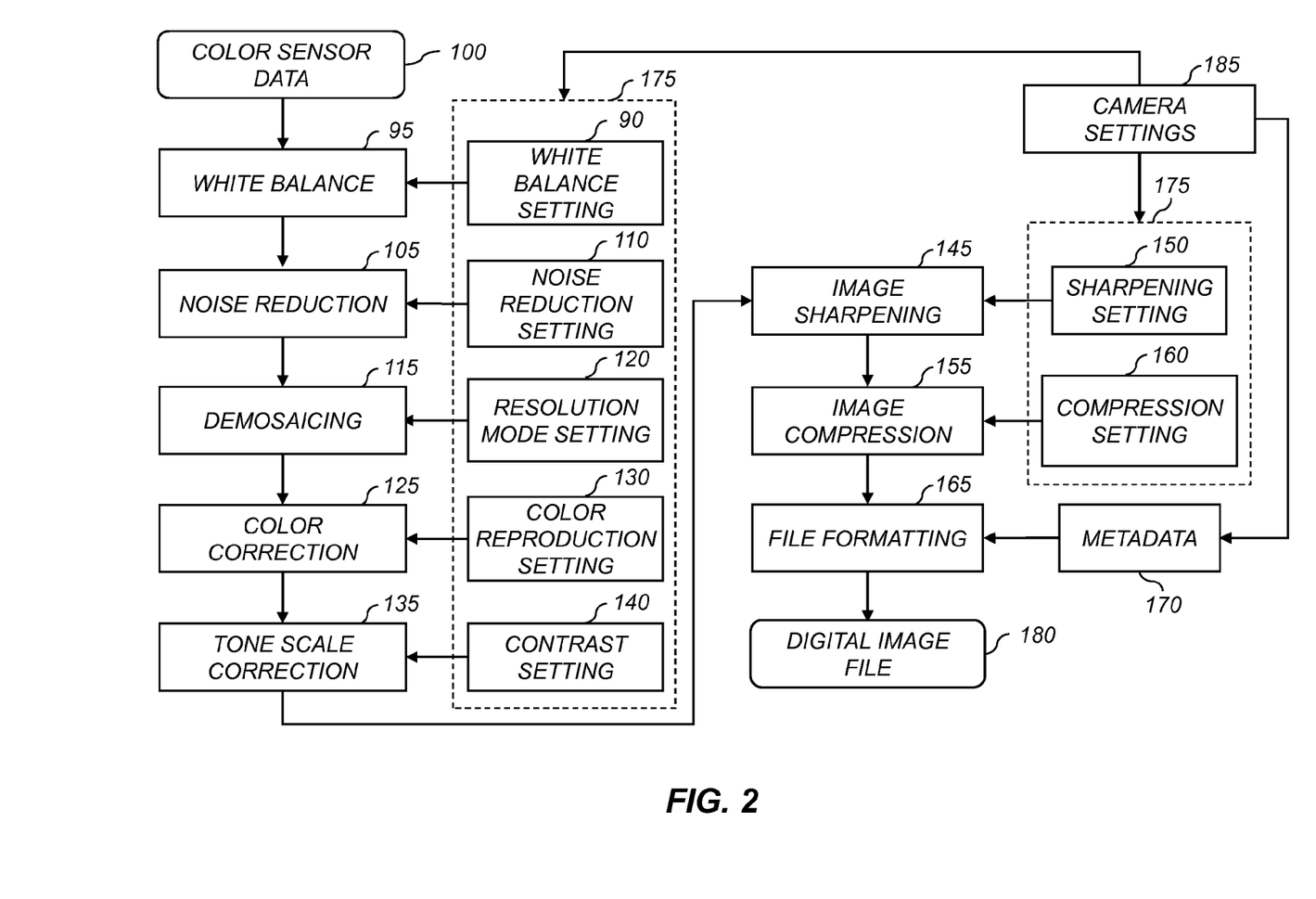
FIG. 2 is a flow diagram depicting image processing operations used to process digital images captured by the digital camera of FIG. 1.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or can be automatically set to different values in accordance with the preferences of the person being photographed, as will be described later in reference to FIG. 4.

The color image data is then manipulated by a noise reduction step 105 in order to reduce noise from the image sensor 14. In some embodiments, this processing can be performed using the methods described in U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to a noise reduction setting 110. The noise reduction setting 110 is generally tied to the camera ISO exposure index setting, so that more filtering is performed at higher ISO exposure index settings. The level of noise reduction can also be automatically set to different values in accordance with the preferences of the person being photographed, as will be described later in reference to FIG. 4

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color reproduction setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125. In some embodiments, the color reproduction setting 130 can be automatically selected in accordance with the preferences of the person being photographed, as will be described later in reference to FIG. 4.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10. In some embodiments, the sharpness setting 150 can be automatically adjusted in accordance with the preferences of the person being photographed, as will be described later in reference to FIG. 4

The color image data is also manipulated by an image compression step 155. In some embodiments, the image compression step 155 can be provided using the methods described in U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression setting 160 is used by the processor 20 to select the particular quantization table to be used for the image compression step 155 for a particular image. In some embodiments, the compression setting 160 can be automatically adjusted in accordance with the preferences of the person being photographed, as will be described later in reference to FIG. 4.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including any photography mode settings 175 that were selected in accordance with the person being photographed. The metadata can also include an indication of the identities of any persons that were identified to be in the captured digital image stored in the digital image file 180.

Figure 3B:
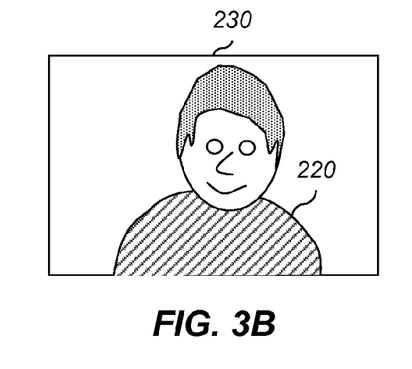
FIGS. 3B-3D illustrate example images captured according to the photographic capture situation of FIG. 3A.
Figure 3C:
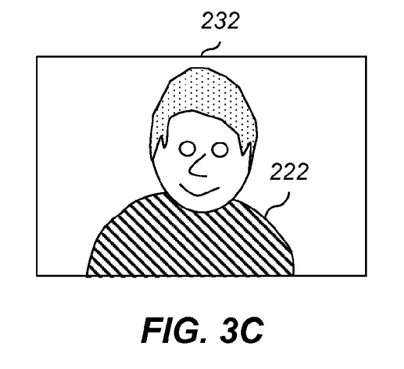
Figure 3D:
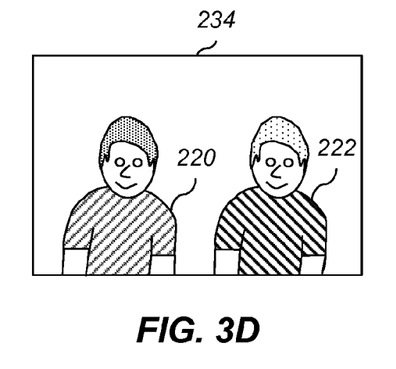

FIG. 3A is a diagram illustrating an example of a photographic capture situation where a photographer 210 is using a digital camera 10 to photograph a scene containing a first person 220 and a second person 222. FIGS. 3B-3D illustrate a series of different digital images that can be captured in the photographic capture situation of FIG. 3A. In FIG. 3B, a digital image 230 is captured that contains only the first person 220; in FIG. 3C, a digital image 232 is captured that contains only the second person 222; and in FIG. 3D, a digital image 234 is captured that contains both the first person 220 and the second person 222. In accordance with the present invention, the captured digital images 230, 232 and 234 are analyzed using a person recognition algorithm, and are then processed using different image processing preferences in accordance with the corresponding identified person(s).

Figure 4:
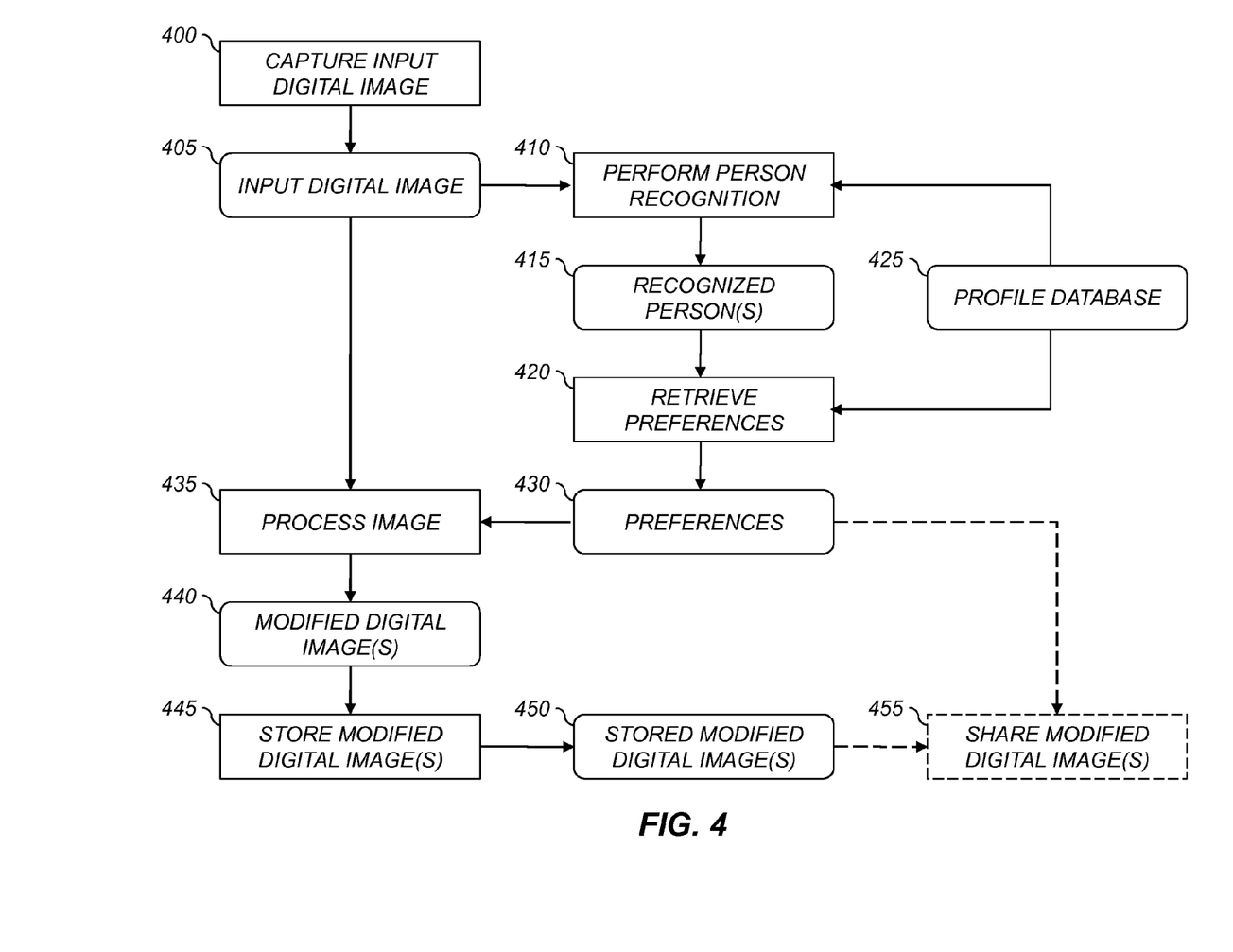
FIG. 4 is a flowchart of a method for providing customized image processing according to the preferences of a person contained in a captured digital image.

FIG. 4 is a flowchart of a method for providing customized image processing according to the preferences of a person contained in a captured digital image according to one embodiment. A capture input digital image step 400 is used to capture an input digital image 405 of a scene, which can include one or more persons. The capture input digital image step 400 will commonly be initiated by a photographer activating an image capture control (e.g., a shutter button) on a digital camera 10 (FIG. 3A). However, any method known in the art can be used to initiate the capture input digital image step. The input digital image 405 can be a digital still image, or alternately can be a digital video sequence including a time sequence of digital image frames.

A perform person recognition step 410 is used to automatically analyze the input digital image 405 to identify one or more recognized person(s) 415. The perform person recognition step 410 can use any person recognition method known in the art. In a preferred embodiment, the person recognition method uses a face recognition algorithm to compare the characteristics of any faces detected in the input digital image 205 with the facial characteristics for a set of reference individuals that the face recognition algorithm has been trained to identify. The facial characteristics of the reference individuals can be stored as person recognition data in a profile database 425. In other embodiments, the person recognition algorithm can use other features that are characteristic of the person instead of, or in addition to, the facial characteristics during the process of determining the recognized person(s) 415. Examples of other characteristics that can be used by a person recognition algorithm in accordance with the present invention would include height, body shape, hair color or eye color.

In a preferred embodiment, the perform person recognition step 410, as well as the other following steps in FIG. 4, are performed in the digital camera 10 using the processor 20 (FIG. 1). Alternately, the various processing steps can be performed on the host computer or server at a later time after the input digital image 405 has been uploaded off the digital camera 10.

In a preferred embodiment, the person recognition data stored in the profile database for the set of reference individuals is determined by capturing training images of the reference individuals and analyzing them to determine the corresponding person recognition data. In some embodiments, a special training process can be initiated using the user interface of the digital camera 10 which instructs the user to photograph an individual and then prompts the user to enter associated information such as the person's name and various person-specific preferences. In other embodiments, the user interface of the digital camera 10 can enable the user to select a face in a previously captured digital image and designate that the person should be added to the profile database 425. In some embodiments, any time the perform person recognition step 410 detects the presence of a person in the input digital image 405 that does not correspond to any of the reference persons in the profile database 425, the user can be presented with the opportunity to add that person as a new entry in the profile database 425.

Figure 5:
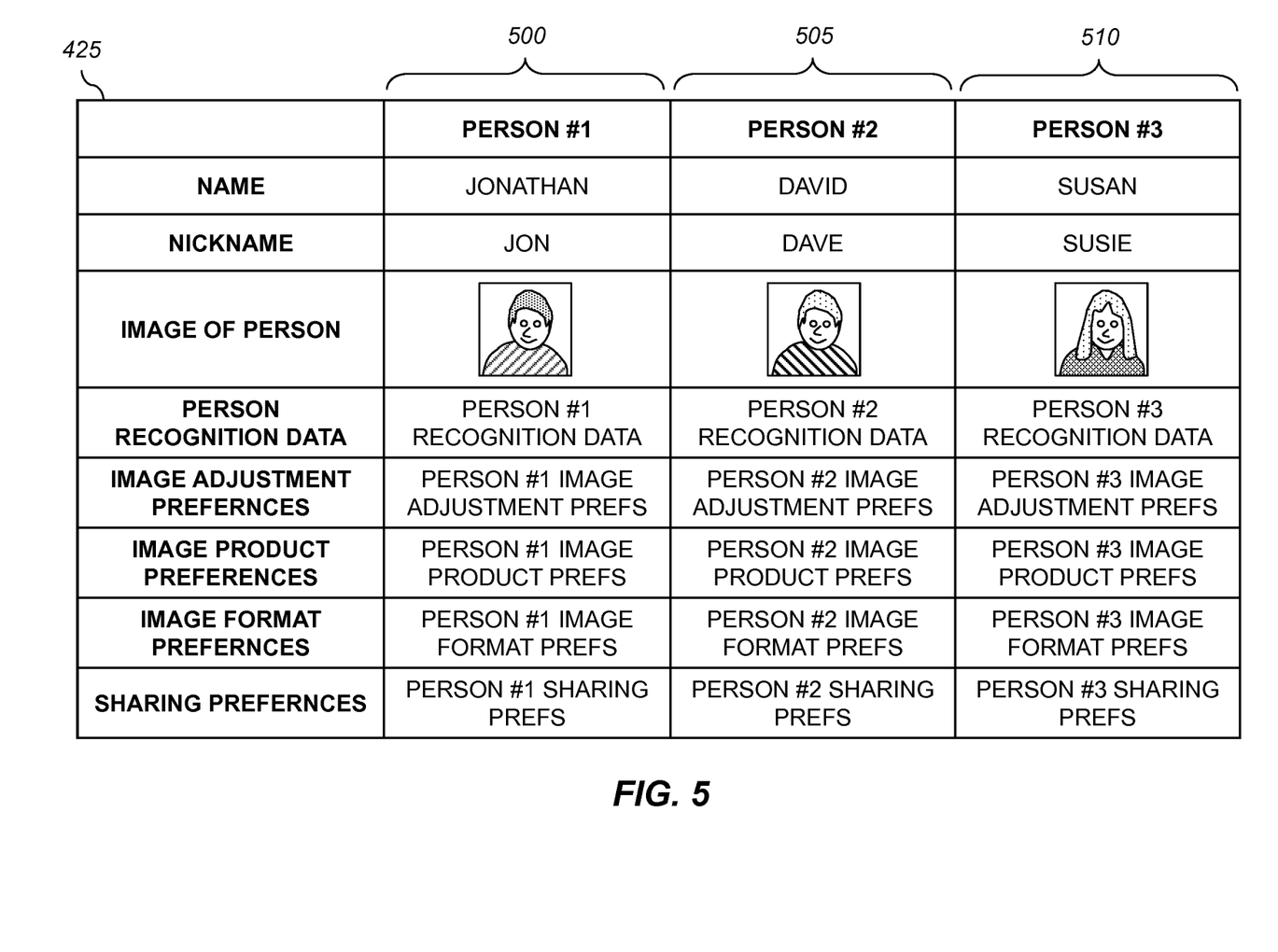
FIG. 5 depicts an example of a profile database.

FIG. 5 illustrates an example of the types of information that can be stored in the profile database 425 in accordance with the present invention. In this example, the profile database 425 contains profiles for three different persons. The person #1 profile 500 contains information pertaining to a first person, Jonathan; the person #2 profile 505 contains information pertaining to a second person, David; and the person #3 profile 510 contains information pertaining to a third person, Susan. The use of user profiles for specifying person-specific preferences has been described in co-pending U.S. patent application Ser. No. 12/769,954, which is incorporated herein by reference.

The profile for each of the persons includes text strings identifying the person's name, and optionally a nickname. In this exemplary embodiment, each profile also includes an image of the persons which can be a relatively low-resolution "thumbnail" image. The images can be stored using any image format known in the art (e.g., using the well-known JPEG image format). This image can be used for various purposes such as to display in a menu of reference individuals on the user interface of the digital camera 10. In some embodiments, the profile images correspond to images of the persons that were captured during the process of training the person recognition algorithm.

The profile for each of the persons also includes person recognition data that is adapted to be used by the perform person recognition step 410. The person recognition data corresponds to the characteristic data used by the person recognition algorithm to compare a detected person in the input digital image 405 with the reference persons in the profile database 425. In a preferred embodiment, the person recognition data includes a plurality of facial parameters corresponding to ratios of distances between identifiable points on the human face. The person recognition data can also include various parameters that can be useful in identifying a person (e.g., hair color, eye color and skin color). In other embodiments, the person recognition data can include one or more reference face images.

The profile for each of the persons also includes various preferences associated with the different persons. In the illustrated example, the preferences include image adjustment preferences, image template preferences, image format preferences and sharing preferences.

Image adjustment preferences can relate to preferences for the way the captured input digital image 405 is processed using various image processing steps such as the user settings 175 shown in FIG. 2. As discussed earlier, the user settings 175 can include white balance settings 90, noise reduction settings 110, resolution mode settings 120, color reproduction settings 130, contrast settings 140, sharpening settings 150 and compression settings 160. The image processing settings can also include any other type of image processing setting known in the art. For example, the image processing settings can include defect correction settings associated with defect correction algorithms such as red-eye correction algorithms or blemish removal algorithms.

In some embodiments, the image processing preferences for a particular person are generated as described in U.S. Pat. No. 7,024,051 entitled "Customizing a digital imaging device using preferred images," to Miller, et al, which is incorporated herein by reference.

In some embodiments, the image processing preferences can be provided by image analysis of the person's favorite images in an image collection associated with the person. For example, the person's Facebook images can be analyzed to determine the type of image settings preferred by the person.

In some embodiments, rather than storing individual settings for each of the image processing steps, the profile can store an identifier for a preferred "processing mode." Each processing mode can be associated with a particular configuration of the lower level image processing settings. For example, a "high color" processing mode can use a "saturated color reproduction" color reproduction setting 130, a high-contrast contrast setting 140, and a moderate sharpening setting 150, and can use default values for the other image processing settings.

Image product preferences can provide an indication of the person's preference for certain types of products (e.g., individual prints, calendars, greeting cards or photo books), or for particular print formats (e.g., 4×6 or 3×5, glossy or matte finish, border or no border). They can also provide preferences relevant to the selection of appropriate image templates that can be used with the input digital image 405 in various products. For example, the image template preferences can include an identifier for preferred borders and backgrounds that can be used with the input digital image 405. Alternately, the image product preferences can relate to lower level aspects that relate to the selection of templates, background and other design elements (e.g., most preferred and least preferred colors and patterns, and preferred font types and graphics).

Image format preferences can relate to various aspects of the way a digital image file is formatted. For example, they can include preferred aspect ratios (e.g., 4:3, 3:2 or 16:9) or preferred image sizes. They can also include preferred file formats (e.g., JPEG, TIFF, GIF, MPEG or WMV).

Sharing preferences can relate to preferred methods to share the input digital image 405 with the person. For example, the sharing preferences can include the specification of an E-mail address, a cell phone number or a Facebook account name for the individual, or an indication that they prefer to view images using the Kodak Gallery website. When images are detected to contain that person, they can be automatically shared with the individual using their preferred sharing method. Commonly-assigned U.S. Pat. No. 6,999,111 to McIntyre et al., entitled "Electronic camera and system for transmitting digital over a communication network," which is incorporated herein by reference, describes a method for automatically sharing a digital image file with an identified party in response to automatically recognizing image content. This approach can be used in accordance with the present invention.

The personalization profile can also include any other information known in the art about the person or the person's preferences. This information can, in some embodiments, be automatically determined by analyzing one or more social network web sites associated with the person, such as their personal MySpace or Facebook page. The information in the personalization profile can include, for example, the person's favorite music genres and groups, the person's hobbies and interests, and the person's favorite sports, athletes and sports teams.

In a preferred embodiment, the profile database 425 is stored in a data memory within the digital camera 10 (for example, in the image memory 30). In other embodiments, the profile database 425 can be stored elsewhere, such as on a host computer or a server. For example, in some embodiments, the person-specific profiles can be stored in an on-line repository. In this case, the digital camera 10 can remotely access the profile database (e.g., using the wired interface 38 or the wireless modem 50). The person-specific profiles can be collected together and stored as a unified profile database 425. Alternately, each person-specific profiles can be stored in different files, possibly in different locations. For example, the person-specific profile for a particular individual can be stored in a location associated with the individual. For example, the person-specific profile can be stored in association with an individual's social networking account (e.g., the individual's Facebook account) or the individual's image sharing website account (e.g., the individual's Kodak Gallery account or Picassa Web account), or in an electronic device associated with the particular individual (e.g., a digital camera, a mobile computing device or a mobile communication device such as a smart phone). In this case, the set of person-specific profiles can be viewed as being part of a virtual profile database 425.

Returning to a discussion of FIG. 4, once the perform person recognition step 410 has identified one or more recognized person(s) 415, a retrieve preferences step 420 is used to retrieve person-specific preferences 430 from the profile database 425. The preferences 420 can include one or more of the preference types discussed with respect to FIG. 5, or any other type of person-specific preference that is known in the art.

For the case where only a single recognized person 415 was identified in the input digital image, the retrieve preferences step 420 can simply retrieve the preferences 430 associated with that particular person. For example, consider the case where the input digital image 405 is the digital image 230 shown in FIG. 3B. This image contains first person 220, which corresponding to person #1 in the profile database 425 of FIG. 5. In this case, the retrieve preference step 420 would retrieve the preferences from the person #1 profile 500. Similarly, if input digital image 405 is the digital image 232 shown in FIG. 3C, the retrieve preference step 420 would retrieve the preferences from the person #2 profile 505 in FIG. 5, which corresponds to the second person 222 in FIG. 3C.

If input digital image 405 is the digital image 234 shown in FIG. 3D, the perform person recognition step 410 would determine that the input digital image contains both the first person 220 and the second person 222. In this case, there are a number of different approaches that can be used by the retrieve preferences step 420 according to various embodiments. In some embodiments, each person in the profile database 425 can be assigned a priority value. Then when the perform person recognition step 410 identifies multiple recognized persons 415, the preferences 430 corresponding to the highest priority individual depicted in the input digital image 405 can be retrieved. For example, if the profile database 425 included data indicating that the second person 222 had a higher priority than the first person 220, then for the digital image 234 shown in FIG. 3D, the retrieve preference step 420 in FIG. 4 would retrieve the preferences from the person #2 profile 505 in FIG. 5. In other embodiments, the retrieve preferences step 420 can retrieve the preferences for each of the recognized persons 415. The input digital image 405 can then be processed according to each person's preferences to create a plurality of resulting images, one for each of the recognized persons 415.

If the input digital image 405 does not contain any persons, or if the perform person recognition step 410 does not identify any persons corresponding to those having profiles in the profile database 425, then the retrieve preferences step 420 can retrieve a default set of preferences 430, or can set the preferences 430 according to any method known in the art. For example, the preferences can be selected by the photographer using the user controls 34 (FIG. 1).

In cases where the perform person recognition step 410 determines that the input digital image 405 includes a person, but the person is not recognizable as one of the persons in the profile database, the photographer can be invited to create a new profile for the detected person, and to define an associated set of image processing preferences.

Once the preferences 430 have been retrieved, a process image step 435 is used to process the input digital image 405 according to the preferences 430 to produce a modified digital image 440. In some embodiments, multiple modified digital images 440 can be produced corresponding to multiple sets of preferences 430 that were retrieved when a plurality of recognized persons 415 were identified in the perform person recognition step 410. In some embodiments, the process image step 435 can also produce a version of the modified digital image 440 according to the preferences of the photographer in addition to the version that is produced according to the preferences 430 of the recognized person(s) 415.

In a preferred embodiment, the process image step 435 processes the input digital image 405 according to the image processing path of FIG. 2, wherein one or more of the user settings 175 (FIG. 2) are adjusted according to image adjustment preferences specified in the preferences 430. Various settings associated with the file formatting step 165 may also be adjusted according to image format preferences specified in the preferences 430. As discussed earlier, the image format preferences may include a preferred image size or aspect ratio. In this case, an image resizing may be applied to adjust the image size, or an image cropping operation may be applied to fit the specified aspect ratio.

A store modified digital image(s) step 445 is used to store the modified digital image(s) 440 thereby providing stored modified digital image(s) 450. Preferably, metadata providing an indication of the identities of any recognized person(s) 415 is stored in association with the stored modified digital image(s) 450. For example, if a stored modified digital image 450 is stored using the standard EXIF file format, the indication of the identities of any recognized person(s) 415 can be stored using the standard EXIF metadata tags. This metadata is useful for a wide variety of different applications, such as image organization and searching.

In a preferred embodiment, the stored modified digital image(s) 450 are stored in the image memory 30 (FIG. 1) in the digital camera 10. In other embodiments, the stored modified digital image(s) 450 can be stored in other processor-accessible memories such as a network server. In some embodiments, the stored modified digital image(s) 450 may be stored for only a temporary time period until they can be shared with the recognized person(s) 415 according to the sharing preferences in the person's user profile.

An optional share modified digital image(s) step 455 can be used to share the stored modified digital image(s) with the recognized person(s) 415. In some embodiments this step is performed in accordance with sharing preferences associated with the person's user profile. The stored modified digital image(s) can be shared using any method known in the art. For example, they can be sent to an E-mail address, uploaded to an on-line photo storage location associated with the photographer (e.g., a Kodak Gallery account, a Picassa Web account or a Facebook account) where they can be shared with the recognized person(s) 415, uploaded directly to on-line photo storage location(s) associated with the recognized person(s) 415, or they can be sent to a mobile device (e.g., a smart phone) associated with the recognized person 415 in the form of a picture text. The share modified digital image(s) step 455 can transfer the stored modified digital image(s) 450 using either a wired or wireless network interface. In the preferred embodiment, the method of FIG. 4 is performed in the digital camera 10 (FIG. 1), and the stored modified digital image(s) 450 are transferred using either the wired interface 38 (FIG. 1) or the wireless modem 50.

In some embodiments, the share modified digital image(s) step 455 can be performed immediately after the stored modified digital image(s) 450 are formed. In other embodiments, the stored modified digital image(s) 450 are marked for sharing, but the actual share modified digital image(s) step is not performed until the stored modified digital image(s) 450 are uploaded to a host computer at a later time. U.S. Pat. No. 6,573,927, which is incorporated herein by reference, teaches one method for marking images for sharing by printing, E-mailing or uploading to a server at a later time that can be used in accordance with the present invention.

It will be recognized that in alternate embodiments different methods besides automatically analyzing the input digital image 405 using a person recognition algorithm can be used to identify the persons that are contained in the input digital image 405. For example, a user interface can be provided to enable the photographer to manually identify the persons contained in a particular input digital image 405 (e.g., by selecting a name from a list of persons contained in the profile database).

Figure 6:
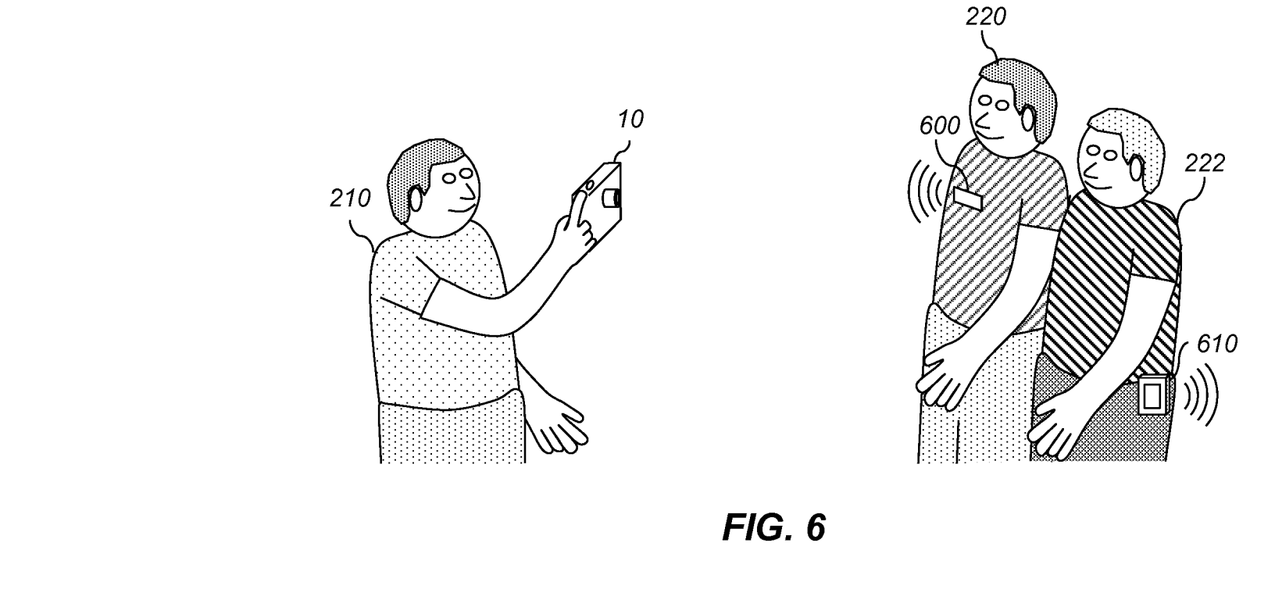
FIG. 6 is a diagram illustrating a photographic capture situation according to an alternate embodiment.

FIG. 6 shows an alternate embodiment that makes use of various wireless technologies to identify the persons in a captured image. In this example, the first person 220 is wearing an RFID tag 600 that emits a radio frequency signal providing information identifying the wearer of the RFID tag 600. The use of RFID tags 600 for identification purposes is well-known in the art. In some embodiments, the RFID tag 600 can be an active device that contains a battery that is used to power a radio frequency transmitter. In other embodiments the RFID tag 600 can be a passive device that does not contain a battery and only transmits a signal when it is in close proximity to a reader. The use of RFID tags to identify persons in a photograph is disclosed by U.S. Pat. No. 6,526,158 to Goldberg, entitled "Method and system for obtaining person-specific images in a public venue." This method involves the automatic distribution of images captured in a public venue such as an amusement park to the persons contained in the images. However, they do not teach or suggest that captured images can be processed according to personalized image processing preferences for the identified individuals.

The second person 222 in FIG. 6 has a mobile communication device 610, such as a cell phone, which can also be used to provide identifying information in some embodiments. Many cell phones have global positioning system (GPS) sensors that allow the geographical location of the cell phone to be determined by analyzing signals received from GPS satellites. Many cell phones include applications that enable the cell phone to share the GPS-determined geographical location with other devices, for example to enable friends, family or law enforcement officials to determine the location of the user of the cell phone. In a similar way, the digital camera 10 can be enabled to receive GPS-determined geographical locations that are made available by applications running on the cell phones of persons that have profiles stored in the profile database 425. The received GPS-determined geographical locations can be compared to a geographical location determined using the GPS sensor 54 in the digital camera 10 to determine whether the person is nearby. An orientation sensor 56 (FIG. 1) in the digital camera 10 can be used to determine whether the digital camera 10 is pointed toward the person.

Figure 7:
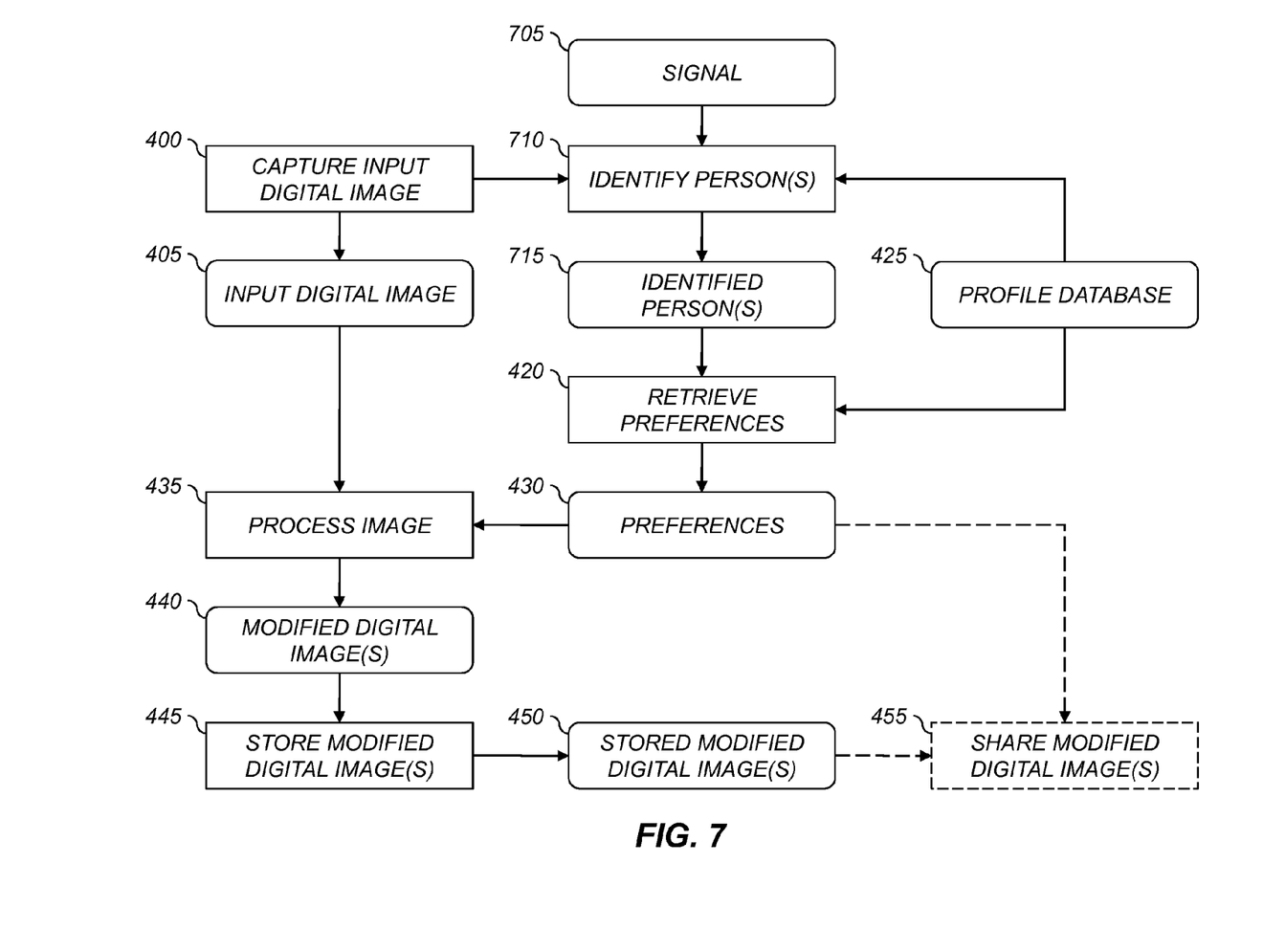
FIG. 7 is a flowchart for an alternate embodiment of a method for providing customized image processing according to the preferences of a person contained in a captured digital image.

FIG. 7 depicts a flowchart of a method for providing customized image processing according to the preferences of a person contained in a captured digital image according to an alternate embodiment. This embodiment parallels that described with reference to FIG. 4 except that a different method is used to identify the person(s) in the input digital image 405. Where the elements of FIG. 7 are equivalent to those shown in FIG. 4, they have been labeled with the same reference numbers.

According to the embodiment of FIG. 7, the perform person recognition step 410 of FIG. 4 has been replaced by an identify person(s) step 710 which determines one or more identified person(s) 715 that are pictured in the captured input digital image 405. In some embodiments, the identify person(s) step 710 receives a signal 705 from an electronic device associated with one or more persons located in positions near the digital camera 10 (FIG. 6). For example, the signal 705 can be a wireless signal received from electronic devices such as the RFID tag 600 or the mobile communication device 610 depicted in FIG. 6. In other embodiments, the signal 705 can be received from other types of electronic devices associated with the person such as another digital camera or a mobile computing device (e.g., a PDA). In some embodiments, the signal 705 can be received over a wired connection rather than being received wirelessly. Identifying information pertaining to devices associated with the persons can be stored in the profile database 425. This identifying information can be compared to information derived from the wireless signals received by the digital camera 10 to determine whether any of the electronic devices are associated with the person profiles in the profile database 425 to determine whether any of those persons are nearby.

For embodiments where the received signal 705 is a signal transmitted by an RFID tag 600 associated with a particular person, the received signal 705 will generally include an identifier associated with the particular RFID tag 600. This can be compared to known RFID tag identifiers stored in the profile database 425 in order to identify the particular person. In this case, the particular person can be assumed to be pictured in the input digital image 405 if the received signal 705 meets specified conditions. For example, the strength of the received signal 705 from the RFID tag 600 will be a function of the distance between the digital camera 10 and the RFID tag 600. Therefore, if the strength of the received signal 705 exceeds a predefined threshold the person who is associated with the particular RFID tag 600 can be designated to be an identified person 715. In some embodiments, the digital camera 10 can include a directional receiver that preferentially receives signals 705 originating in the field of view of the digital camera 10. This can be useful to help avoid false positives where a nearby person that is not in the field of view is designated to be an identified person 715.

For embodiments where the received signal 705 includes a GPS-determined geographical location for the person's electronic device, it can be compared with a GPS-determined geographical location determined for the digital camera to determine a relative position of the two devices. In some implementations, it can be assumed that if the geographical location of the digital camera 10 is closer than a predetermined threshold distance to the geographical location of the person's electronic device that person is probably pictured in the input digital image 405. That person is therefore designated to be an identified person 715. In other variations, an orientation sensor 56 (FIG. 1) in the digital camera 10 can be used to determine the direction that the digital camera 10 is pointing. In this case, the person is only designated as an identified person 715 if the digital camera 10 is nearby and pointing toward the geographical location of the person's electronic device.

Color Labs, Inc. has recently introduced an iPhone App called "Color" which allows iPhone users to instantly share images captured with their iPhone with other iPhone users that are near the same location. This makes it possible for a person to view images of themselves captured on other people's iPhones. In accordance with the present invention, a similar application could be developed that includes the added feature of processing the captured digital images that are shared with another person according to the personal preferences of the person pictured in the captured image who receives the captured image from another person's smart phone.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
12 timing generator
14 image sensor
16 ASP and A/D Converter
18 buffer memory
20 processor
22 audio codec
24 microphone
26 speaker
28 firmware memory
30 image memory
32 image display 34 user controls
36 display memory
38 wired interface
40 computer
44 video interface
46 video display
48 interface/recharger
50 wireless modem
52 radio frequency band
54 GPS sensor
56 orientation sensor
58 wireless network
70 Internet
72 photo service provider
90 white balance setting
95 white balance step
100 color sensor data
105 noise reduction step
110 noise reduction setting
115 demosaicing step
120 resolution mode setting
125 color correction step
130 color reproduction setting
135 tone scale correction step
140 contrast setting
145 image sharpening step
150 sharpening setting
155 image compression step
160 compression setting
165 file formatting step
170 metadata
175 user settings
180 digital image file
185 camera settings
210 photographer
220 first person
222 second person
230 digital image
232 digital image
234 digital image
400 capture input digital image step
405 input digital image
410 perform person recognition step
415 recognized person(s)
420 retrieve preferences step
425 profile database
430 preferences
435 process image step
440 modified digital image(s)
445 store modified digital image(s) step
450 stored modified digital image(s)
455 share modified digital image(s) step
500 person #1 profile
505 person #2 profile
510 person #3 profile
600 RFID tag
610 mobile communication device
705 signal
710 identify person(s) step
715 identified person(s) step

The invention claimed is:

1. A digital camera system providing customized image processing, comprising:
a data processing system;
an image sensor communicatively connected to the data processing system;
an optical system communicatively connected to the data processing system and configured to form an image of a scene onto the image sensor;
a memory communicatively connected to the data processing system;
a data memory communicatively connected to the data processing system and configured to store image processing preferences associated with a plurality of persons; and
a program memory communicatively connected to the data processing system and storing executable instructions configured to cause the digital camera system to:
capture an image of a scene using the image sensor;
analyze the image;
identify a first person in the image based on the image analysis;
obtain first image processing preferences specific to the first identified person;
process the entire image to form a modified image according to the first image processing preferences; and
store the first modified image in the memory.

2. The digital camera system of claim 1 wherein the first image processing preferences include at least one of a sharpening setting, a color reproduction setting, a compression setting, a noise reduction setting, a defect correction setting, an image size setting, an aspect ratio setting and a file format setting.

3. The digital camera system of claim 1 wherein the first modified image is transmitted to the identified first person.

4. The digital camera system of claim 1 wherein:
the executable instructions configured to cause the digital camera system to identify are further configured to cause the digital camera system to identify a second person, different from the identified first person, based on the image analysis;
the executable instructions configured to cause the digital camera system to obtain are further configured to cause the digital camera system to—
obtain second image processing preferences different from the first image processing preferences and specific to the identified second person,
obtain a first value indicative of a priority of the first image processing preferences, and
obtain a second value indicative of a priority of the second image processing preferences; and
the executable instructions configured to cause the digital camera system to process comprise executable instructions configured to cause the digital camera system to—
process the entire image to form a modified image according to the first image processing preferences when the first value is indicative of a priority that is higher than the second value, and
process the entire image to form a modified image according to the second image processing preferences when the second value is indicative of a priority that is higher than the first value.

5. The digital camera system of claim 1 wherein when a first plurality of people are identified in the image, the entire image is processed a second plurality of times to form a second plurality of modified images, each modified image corresponding to, and based on, image processing preferences specific to one identified person.

6. The digital camera system of claim 5 wherein each of the second plurality of modified images are transmitted to the corresponding identified person.

7. The digital camera system of claim 1 further including:
user interface elements; and
executable instructions stored in the program memory configured to cause the digital camera system to—
identify a new person in the input image who does not have associated image processing preferences stored in the data memory,
designate, by way of the user interface elements, new image processing preferences,
associate the new image processing preferences with the new person, and
store the new image processing preferences in the data memory.

8. The digital camera system of claim 7, further including a wireless network interface communicatively connected to the data processing system and configured to receive the new image processing preferences from a wireless network.

9. The digital camera system of claim 8, wherein the wireless network comprises at least one of a social networking account and an image sharing website account.

10. The digital camera system of claim 7, wherein the instructions to cause the digital camera system to store the new image processing preferences further comprise instructions to store indication of the new person's identity as metadata in a digital image file used to store the first modified image.

11. The digital camera system of claim 1 wherein the image comprises one of a still image and a video sequence.

12. The digital camera system of claim 1 wherein the first person is identified, at least in part, by analyzing a signal received from an electronic device associated with the person.

13. The digital camera system of claim 1 wherein the memory comprises memory that is, at least in part, distal from the digital camera system.

14. The digital camera system of claim 12 wherein the electronic device comprises one or more of another digital camera, a mobile computing device, a mobile communication device, and an RFID tag.

15. The digital camera system of claim 12 wherein the signal includes geographical location data of the electronic device.

16. The digital camera system of claim 12 wherein the electronic device comprises an RFID tag, and wherein the signal provides an identifier.

17. A method for providing customized image processing, comprising;
receiving an input digital image of a scene;
identifying at least one particular person in the input digital image by analyzing a signal received from an electronic device associated with the at least one particular person;
retrieving image processing preferences specific to each of the at least one identified particular persons from a memory;
using a data processor to process the input digital image to form a modified digital image for each of the identified particular persons according to each identified particular person's retrieved image processing preferences; and
storing each of the at least one modified digital images in the memory.

18. A digital camera system, comprising:
a data processing system;
an image sensor communicatively connected to the data processing system;
an optical system communicatively connected to the data processing system and configured to form an image of a scene onto the image sensor;
a network interface communicatively connected to the data processing system;
a memory communicatively connected to the data processing system, the image sensor and the network interface, wherein the memory is configured to store one or more one image processing preferences each specific to an individual person, and further configured to store executable instructions to cause the data processing system to—
capture an image of a scene using the image sensor;
analyze the captured image;
identify a first specific person in the captured image based on the image analysis;
obtain, from a profile database, first image processing preferences specific to the identified first specific person;
process the entire image to form a first modified image according to the first image processing preferences; and
store the first modified image in the memory.

19. The digital camera system of claim 18 wherein the instructions to store further comprise instructions to cause the data processing system to transmit the first modified image to the identified first person through the network interface.

20. The digital camera system of claim 18 wherein the instructions to cause the data processing system to obtain comprise instructions to cause the data processing system to retrieve the first image processing preferences from a remote profile database through the network interface.

21. The digital camera system of claim 18 wherein the instructions to cause the data processing system to identify a first person further comprise instructions to cause the data processing system to identify an additional one or more specific people in the captured image based on the image analysis.

22. The digital camera system of claim 21 wherein the instructions to cause the data processing system to obtain further comprise instructions to cause the data processing system to obtain, from the profile database, image processing preferences for each of the additional one or more specific people, each image processing preference specific to one of the additional one or more specific people.

23. The digital camera system of claim 22 wherein the instructions to cause the data processing system to process further comprise instructions to cause the data processing system to:
process the entire image to form a first modified image according to the first image processing preferences; and
process the entire image to form an additional one or more modified images according to the one or more image processing preferences, each modified image corresponding to one of the one or more image processing preferences.

* * * * *